Sept. 23, 1969   J. A. WRIGHT ET AL   3,468,460
ADJUSTABLE SKI RACKS
Filed June 19, 1967   3 Sheets-Sheet 1
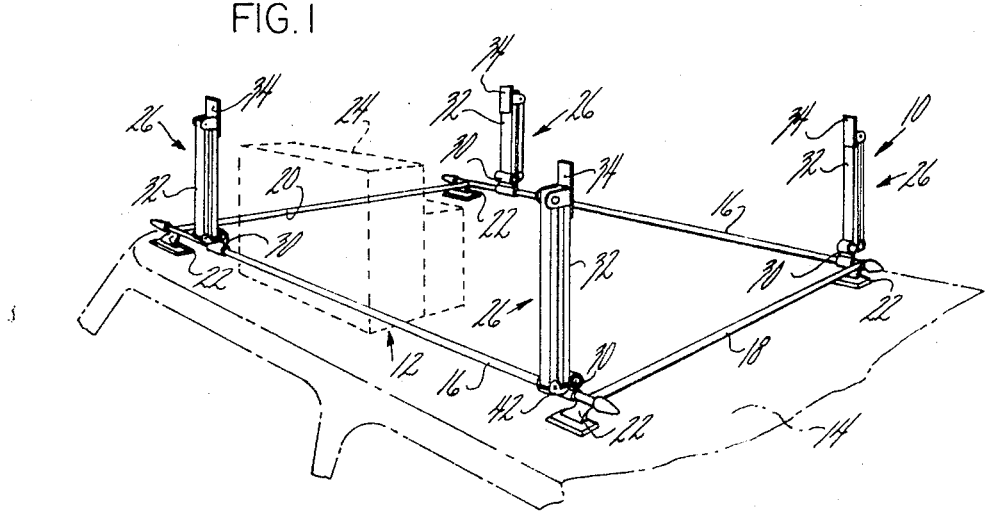
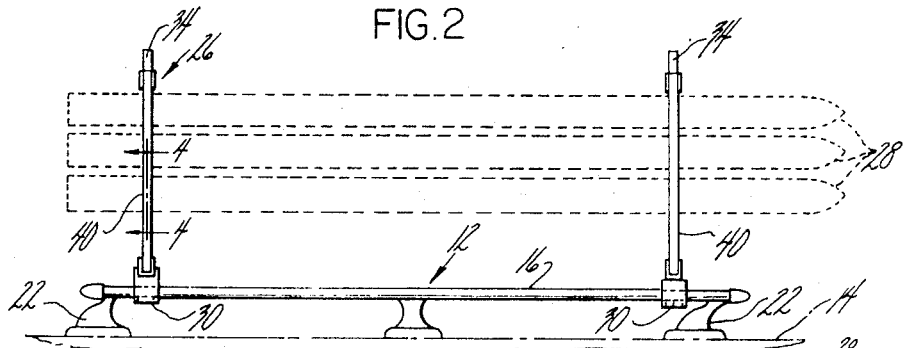
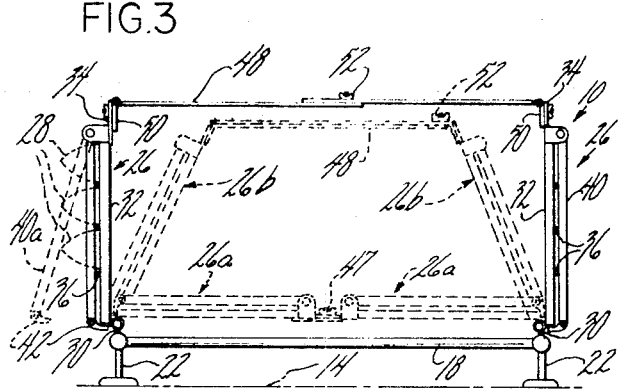
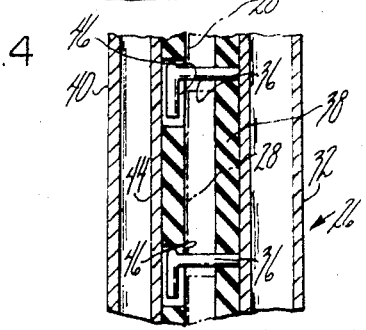
INVENTORS
JANE A. WRIGHT
JOHN C. WRIGHT
BY *McCormick, Paulding & Huber*
ATTORNEYS

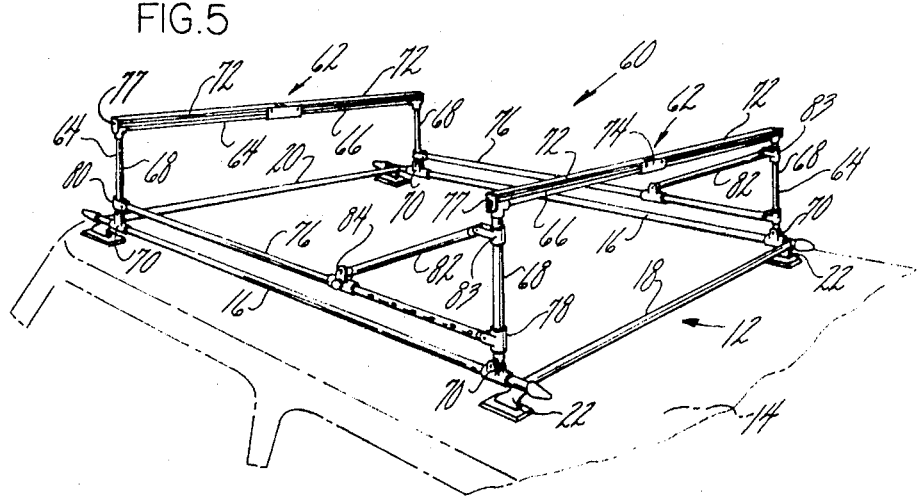
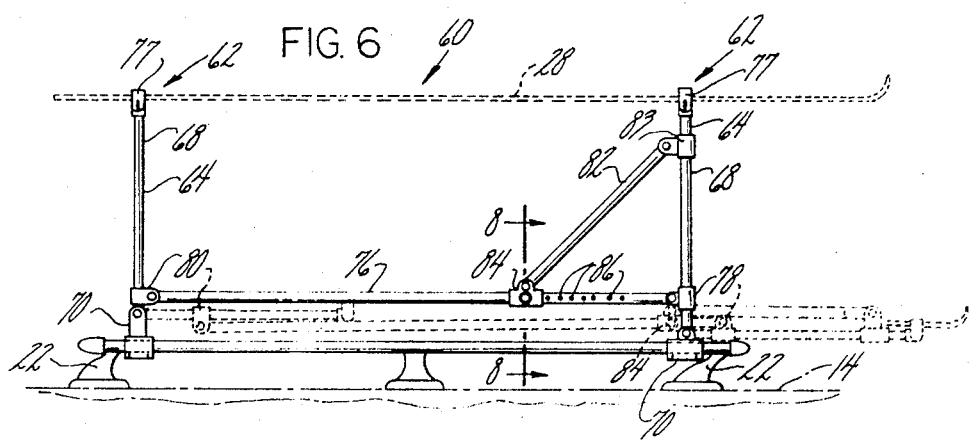
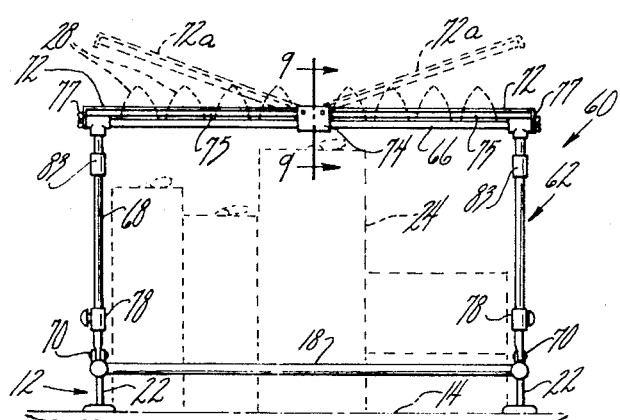
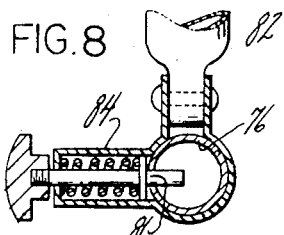
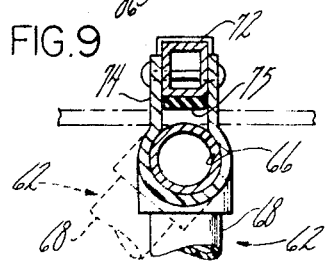

Sept. 23, 1969    J. A. WRIGHT ET AL    3,468,460
ADJUSTABLE SKI RACKS
Filed June 19, 1967    3 Sheets-Sheet 3
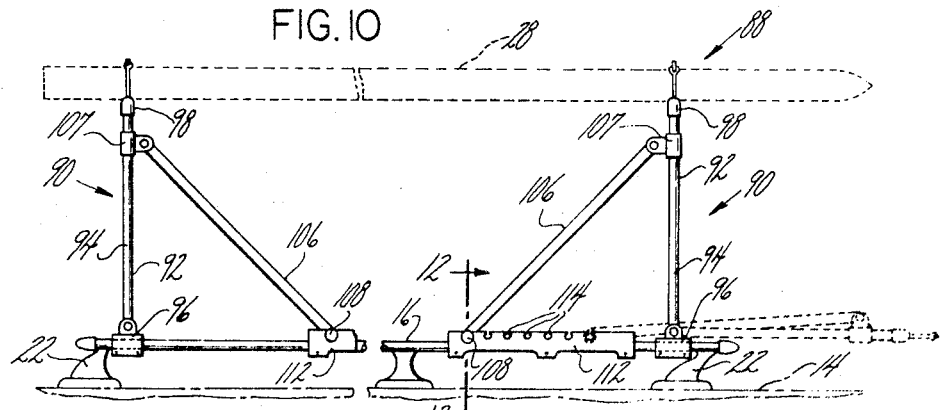
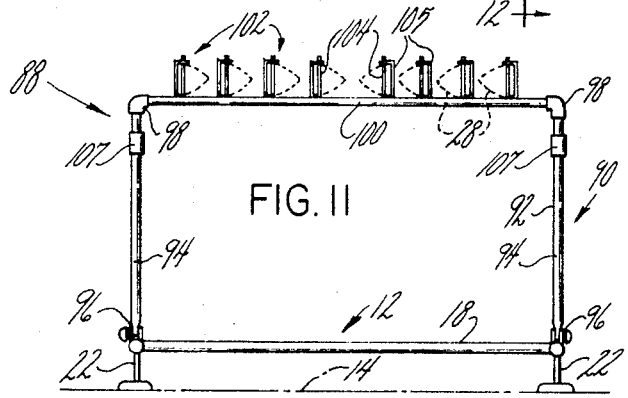
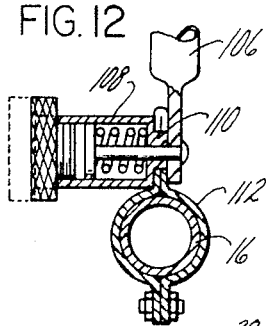
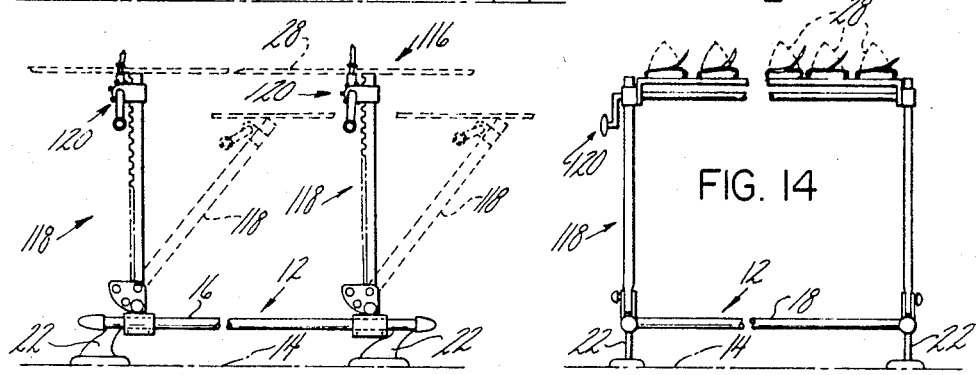
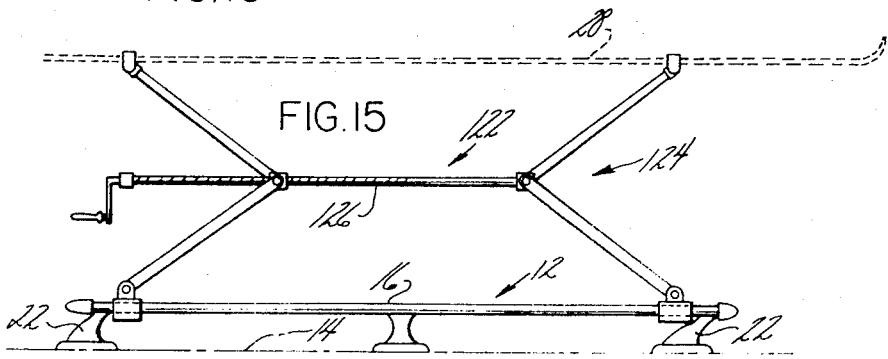

United States Patent Office 3,468,460
Patented Sept. 23, 1969

3,468,460
ADJUSTABLE SKI RACKS
Jane A. Wright and John C. Wright, both of 64 Wylls St.,
Manchester, Conn. 06040
Filed June 19, 1967, Ser. No. 646,828
Int. Cl. B60r 7/00, 9/04
U.S. Cl. 224—42.1                              17 Claims

ABSTRACT OF THE DISCLOSURE

An adjustable ski rack for attachment to an automobile mounted luggage carrier and having adjustable means for supporting skis in generally parallel side-by-side relation and clamping means for detachably securing the skis to the supporting means. The supporting means is adjustable relative to the luggage carrier through a range of positions between a lowered position wherein the skis are supported generally adjacent the luggage carrier and an elevated position wherein the skis are supported in spaced relation thereto so that maximum luggage carrying space is available and readily accessible.

BACKGROUND OF THE INVENTION

This invention relates to ski racks and deals more particularly with adjustable ski racks for mounting on a conventional luggage carrier of the automobile attached type.

The various types of automobile attached luggage carriers presently available are generally not ideally suited for transporting skis. Ski racks have been provided for mounting on such carriers; however, a ski rack of this type usually reduces the luggage capacity of an associated carrier and may in some instances render it unavailable for transporting luggage. The general aim of this invention is, therefore, to provide a ski rack for use in association with an automobile attached luggage carrier to transport skis without impairing the function of the associated carrier. A further object of the invention is to provide an adjustable ski rack of simple durable construction and pleasing appearance for economical manufacture.

SUMMARY OF THE INVENTION

In accordance with the present invention, a ski rack is provided for attachment to an automobile mounted luggage carrier or the like and for adjustable positioning relative thereto so that skis and/or luggage may be carried on an automobile in immediately accessible positions.

BRIEF DESCRIPTION OF THE DRAWINGS

FIG. 1 is a perspective view of an adjustable ski rack embodying the present invention and mounted on a luggage carrier attached to the roof of an automobile, the general position of luggage transported on the carrier being indicated by broken lines.

FIG. 2 is a side elevational view of the embodiment of FIG. 1.

FIG. 3 is a front elevational view showing the ski rack of FIG. 1 in an elevated position, an intermediate position and a lowered position of the rack being indicated by broken lines.

FIG. 4 is a fragmentary sectional view taken generally along the line 4—4 of FIG. 2.

FIG. 5 is a perspective view generally similar to FIG. 1 but shows another ski rack embodying the present invention in association with an automobile roof mounted luggage carrier.

FIG. 6 is a side elevational view of the ski rack of FIG. 5 shown in an elevated position, a lowered position being indicated by broken lines.

FIG. 7 is a front elevational view of the rack of FIG. 5.

FIG. 8 is a fragmentary sectional view taken generally along the line 8—8 of FIG. 6.

FIG. 9 is a fragmentary sectional view taken generally along the line 9—9 of FIG. 7.

FIG. 10 is a side elevational view showing still another adjustable ski rack embodying this invention and associated with an automobile roof mounted luggage carrier.

FIG. 11 is a front elevational view of the rack of FIG. 9.

FIG. 12 is a fragmentary sectional view taken along the line 12—12 of FIG. 10.

FIG. 13 is a fragmentary side elevational view of an adjustable ski rack showing a further embodiment of the invention.

FIG. 14 is a fragmentary front elevational view of the rack of FIG. 13.

FIG. 15 is a side elevational view of an adjustable ski rack showing a still further embodiment of the invention.

BRIEF DESCRIPTION OF PREFERRED EMBODIMENTS

Ski racks embodying the present invention are illustrated in the drawings and hereinafter described in association with a luggage carrier mounted on the roof of an automobile; however, it should be understood that the present racks are not limited to use with roof mounted luggage carriers and may be used in combination with various other types of automobile attached carriers.

Turning now to the drawings and referring first to FIGS. 1–4, an adjustable ski rack embodying the present invention and indicated generally at 10 is shown mounted on a luggage carrier indicated generally at 12 and attached to an automobile roof 14. The luggage carrier 12 is of a conventional type and includes a rectangular tubular frame having side rails 16, 16 connected by front and rear cross rails respectively indicated at 18 and 20. A plurality of stanchions 22, 22 mounted on the roof 14 support the frame in spaced relation thereabove to generally define a space for carrying luggage such as indicated at 24.

The ski rack includes at least two relatively spaced ski support assemblies attached to one of the rails for supporting skis. The rack 10 has four substantially identical ski support assemblies indicated generally at 26, 26 arranged in transversely opposed pairs. Each pair of support assemblies is connected to an associated side rail 16 and cooperates to support skis 28, 28 laid thereacross in a manner shown in FIGS. 2 and 3 and hereinafter further described. A locking hinge bracket 30 connects each support assembly 26 to its associated side rail 16 for pivotal movement about an axis generally parallel to the rail between a first or lowered position indicated by broken lines at 26a in FIG. 3 and a second or elevated position shown in full lines in FIGS. 1–3 and through a range of intermediate positions, a typical intermediate position being indicated at 26b in FIG. 3. In the lowered position the skis 28, 28 are supported generally adjacent the luggage carrier 12 and it is in this position that skis are usually carried when the luggage rack is not in use. In the elevated position and in the various intermediate positions each support assembly 26 extends generally upwardly from its associated side rail to support skis above the luggage carrier so that luggage may be transported on the carrier. The hinge brackets 30, 30 are preferably of a type which may be locked in a plurality of selected angular positions to releasably retain each support assembly 26 in the various positions of adjustment aforedescribed.

Considering now one of the support assemblies in further detail and referring particularly to the front support assembly 26 as it appears in its elevated position at the left in FIG. 3, it will be noted that this support assembly includes a support member 32 connected at one end of the hinge bracket 30. The support member is preferably made from tubular metal and as shown has a rectangular cross section and an anchor plate 34 which extends upwardly from its upper or free end. A series of generally L-shaped ski support brackets 36, 36 welded or otherwise secured at spaced intervals along the support member 32 project outwardly therefrom or in a direction generally away from the center of the luggage carrier as best shown in FIG. 4. Each bracket 36 has a downwardly turned outer end portion and is or may be coated with plastic or like material to prevent damage to the finish of a ski which rests thereon. The spacing between adjacent ski support brackets is somewhat greater than the width of the widest ski which rack is to accommodate. To further protect the ski finish, an elongated cushion member 38 made from a suitable material such as rubber or plastic is secured to the outwardly facing surface of the support member.

For detachably securing skies to the support member 32, the support assembly 26 includes an elongated clamp arm 40 pivotally connected at its upper end to the upper end of the support member. The clamp arm 40 is movable generally toward and away from the support member between a clamping or ski engaging position shown in full lines and a releasing or broken line position indicated at 40a wherein the skis 28, 28 may be removed from the rack. At its lower end the arm 40 has a movable latch member 42 arranged to releasably engage the lower end of the support member 32 to retain the arm in its clamping position. If desired, the latch member 42 may include an integral locking mechanism to prevent unauthorized removal of skis from the rack 10. A cushion member 44 generally similar to the cushion member 38 is secured along the inwardly facing surface of the arm 40. Inwardly opening recesses 46, 46 in the cushion member 44 receive the outer end portions of the ski support brackets 36, 36 when the arm 40 is in its clamping position as best shown in FIG. 4. In the latter position the cushion members 38 and 44 clampingly engage opposite sides of the skis 28, 28 and prevent their movement relative to the rack. The clamp arm 40 is movable to its releasing position in all adjusted positions of the support assembly, hence skis supported on the rack are readily accessible at all times and may be removed therefrom without disturbing luggage which may be positioned on the carrier.

Preferably, the length of each support member 32 is approximately equal to one-half the distance between the side rails 16, 16 so that opposite support members 26, 26 cooperate in their lowered position to transversely span the side rails with their anchor plates 34, 34 in overlapping engagement as shown in FIG. 3. A fastener such as indicated at 47 serves to releasably connect the support members in the lowered position and may, for example, be carried by the anchor plate on one support member and engage a fastener receiving opening in the anchor plate of the opposite member.

In some instances it may be desirable to further stabilize the support assemblies in the elevated position and in the various intermediate positions aforedescribed and, for this purpose, a cross brace may be provided to connect opposite upwardly extending support members at their upper ends. Such a cross brace is indicated at 48 in FIG. 3 and is preferably made in two parts, each of the parts having a hinged end portion 50 for attachment to an anchor plate 34 on an associated support member by a suitable fastener. One of the latter parts carries a fastener 52 at its inner end which is received in a transversely extending slot in the other part so that the length of the cross brace 48 may be adjusted to accommodate the associated support assemblies 26, 26 in their various intermediate positions. If desired, provision may be made to fold each part of the cross brace 48 to a position adjacent its associated support assembly when the cross brace is not in use, but preferably and as shown each cross brace is removed from the rack when the support assemblies 26, 26 are connected in the lowered position.

Referring now to FIGS. 5–9, another ski rack embodying the present invention and indicated generally at 60 is shown attached to the luggage carrier 12. The rack 60 is preferably made from tubular metal to complement the general appearance of the luggage carrier and includes two substantially identical longitudinally spaced ski support assemblies generally indicated at 62, 62. The support assemblies cooperate in a first or lowered position indicated by broken lines in FIG. 6 to support skis 28, 28 generally adjacent the luggage carrier and in a second or elevated position to support skis in spaced relation thereabove so that luggage carrying space is immediately accessible, the rack in its elevated position being shown in full lines in FIGS. 5–7.

Considering now the front support assembly 62 as it appears in its elevated position at the right in FIGS. 5 and 6, it will be noted that the support assembly includes an inverted U-shaped support member 64 made from tubular metal parts joined together by suitable fittings. It includes a transversely extending cylindrical ski support portion 66 and legs 68, 68 which extend downwardly from the ends of the ski support portion. The lower end of each leg 68 is pivotally connected to a bracket 70 clamped to an associated side rail 16 so that the support assembly 62 is arranged for pivotal movement about an axis extending transversely of the luggage carrier 12.

Various means may be employed to detachably secure skis to the rack 60 and to the other rack embodiments hereindescribed, but preferably a pair of clamp arms 72, 72 are provided for this purpose. Each clamp arm 72 is preferably made from tubular metal of generally rectangular cross section and is pivotally connected at its inner end to a bracket 74 mounted proximate the center of the ski support portion 66. Each arm is movable generally toward and away from its associated ski support portion between a clamping or full line position shown in FIG. 7 and a releasing position indicated by broken lines at 72a. Each bracket 74 is arranged to turn freely on an associated ski support 66. Thus when skis are secured to the rack 60 each clamp arm 72 remains in a position immediately above its ski supporting portion 66 in all adjusted positions of the rack as best shown in FIG. 9, an intermediate position of the support assembly 62 being indicated by broken lines. An elongated cushion member 75 extends along the lower surface of each clamp arm 72 for engaging the upper surface of skis clamped to the rack. At its outer end each arm 72 carries a movable latch 77 for engaging an associated support member 64 to releasably retain the arm in its clamping position.

To facilitate rack adjustment the front and rear support assemblies 62, 62 are arranged to move in unison when one of the support assemblies is moved and for this purpose connecting links 76, 76 are provided. Each of the links 76 extends between a leg of the front support member and a corresponding leg of the rear support member in general parallel relation to an associated side rail 16. Brackets respectively indicated at 78, 78 and 80, 80 connect the links to the legs so the angular movement of one supoprt assembly 62 relative to the luggage carrier 12 causes a corresponding movement of the other support assembly 62.

To releasably retain the rack 60 in its various positions to adjustment at least one brace is provided for establishing fixed connection between one of the support members 64, 64 and one of the links 76, 76. In the illustrated embodiment of the invention, two such braces 82, 82 are provided. Each brace 82 is pivotally connected at one end to a bracket 83 attached to a front leg 68 in spaced relation to the bracket 78 and is pivotally connected at its other end to a detent or locking member 84 which slidably engages a link 76 on the same side of the rack. The locking member 84 includes a spring biased pin mechanism, best shown in FIG. 8, for selectively engaging associated pin receiving openings 86, 86 in the link 76 to thereby releasably retain the rack 60 in a selected position of adjustment.

In FIGS. 10–12 is shown still another ski rack embodying the invention and indicated generally at 88. The rack is shown mounted on the luggage carrier 12 and it will be noted that it is similar in several respects to the previously described rack 60. Specifically, the rack 88 generally includes two substantially identical longitudinally spaced support assemblies 90, 90 made from tubular metal joined together by suitable fittings. Like the support assemblies 62, 62 of the previously described racks 60, the support assemblies 90, 90 are mounted on the luggage carrier 12 for pivotal movement relative thereto to various positions of adjustment as aforedescribed.

Considering the forward assembly 90 as it appears in its elevated position at the right of FIG. 10, it will be noted that the assembly includes a support member 92 having two legs 94, 94. Each leg is pivotally connected to a bracket 96 mounted on an associated side rail 16 and has at its upper end an elbow-like fitting 98. The support member 92 further includes a generally cylindrical ski support portion 100 extending between the upper ends of the legs and having its end portions received in the fittings 98, 98 for free turning movement therein. A series of ski clamps 102, 102 spaced along the ski support portion 100 serves to detachably secure skis thereto. Each ski clamp 102 includes a pin 104 which projects upwardly from the ski support portion and a resilient strap 105 anchored at one end near the base of the pin and having a free upper end arranged to be looped over the pin to secure a ski in edge-up position adjacent the pin. When skis are secured to the rack the pins 104, 104 remain in a substantially upright position in all positions of rack adjustment due to the movable arrangement of the ski support portion 100 relative to the fittings 98, 98.

The support members 90, 90 may be individually adjusted or, if preferred, the skis may be secured to the two support members while they are in the lowered position. Thereafter, movement of one of the members to an adjusted position will effect a corresponding movement of the other member. If the rack is used in this manner, a single brace such as 106 will serve to retain it in any one of its positions of adjustment. Preferably, a pair of braces 106, 106 serve to retain the front support member 92 in a selected position of adjustment. Each brace 106 is pivotally connected at one end to a bracket 107 attached to one of the legs 94 in spaced relation to the bracket 96 which supports the leg. At its other end each brace 106 is pivotally connected to a locking mechanism 108 which includes a spring biased detent member 110 of a well known type as shown in FIG. 12. The detent mechanism 108 cooperates with a bracket 112 clamped to an associated one of the side rails 16 and having a longitudinally spaced series of detent receiving notches 114 corresponding to the various positions of rack adjustment.

In each of the previously described embodiments of the invention the position of the ski rack is adjusted relative to the luggage carrier 12 by adjustably positioning the support assemblies individually or in unison; however, if desired, means may also be provided for elevating or lowering the rack.

In FIGS. 13 and 14 an adjustable ski rack 116 is shown to include front and rear support assemblies 118, 118 pivotally connected to a luggage carrier 12 for adjustable positioning relative thereto in the general manner aforedescribed. A rack and pinion mechanism of a well known type is indicated generally at 120 and operatively associated with each ski supporting member for moving the ski supporting portion of the member to the desired position of adjustment.

In FIG. 15 an adjustable ski rack indicated generally at 122 and illustrating a further embodiment of the invention is shown in association with the luggage carrier 12. The rack 122 includes a componud lever system indicated generally at 124 for supporting skis in the various positions of adjustment aforedescribed. A lead screw 126 operatively connected to the lever system provides a means for moving the rack to the various positions of adjustment.

The drawings show preferred embodiments of the invention and such embodiments have been described, but it will be understood that various changes may be made from the construction disclosed and that the drawings and description are not to be construed as defining or limiting the scope of the invention, the claims forming a part of the specification being relied upon for that purpose.

We claim:

1. An adjustable ski rack for use in combination with a luggage carrier having relatively spaced rails said ski rack comprising, a plurality of relatively spaced support members across which the skis are supported in parallel side-by-side relation, means for detachably securing the skis to said support members, and means for connecting each of said support members to at least one of said rails for pivotal movement relative thereto, each of said support members having a fixed radial length, said support members being pivotally movable between a first position wherein said support members are disposed in a plane generally parallel to and generally adjacent the plane of said rails and the skis are supported generally adjacent the luggage carrier and a second position wherein said support members extend generally vertically upwardly from said one rail and the skis are supported above the luggage carrier in spaced relation thereto and generally parallel to the plane of said rails.

2. An adjustable ski rack as set forth in claim 1 including means for releasably retaining said supporting means in said first position and said second position and in a range of intermediate positions therebetween.

3. An adjustable ski rack as set forth in claim 1 including means for causing said support members to move in unison between said first and second positions when one of said support members is so moved.

4. An adjustable ski rack as set forth in claim 1 including means for moving said support members between said first and second positions.

5. An adjustable ski rack as set forth in claim 4 wherein said moving means comprises a rack and pinion mechanism operatively associated with said support members.

6. An adjustable ski rack as set forth in claim 1 wherein said support members comprise a pair of relatively spaced inverted generally U-shaped frames, each of said frames having a central ski supporting portion extending transversely of said rails and including a pair of transversely spaced generally parallel legs extending from said central portion, each of said legs being pivotally connected to an associated one of the rails by said connecting means for movement about an axis extending transversely of the rails.

7. An adjustable ski rack as set forth in claim 6 including a link pivotally connected to said frames and extending therebetween in spaced relation to the axes of said legs.

8. An adjustable ski rack as set forth in claim 7 including a brace pivotally connected to one of said frame in spaced relation to the link axis associated with said one frame and means for releasably retaining said brace in engagement with said link in a plurality of selected positions to retain said frames in said first and second positions and in a range of intermediate positions therebetween.

9. An adjustable ski rack as set forth in claim 6 including a brace connected to at least one of said frames for pivotal movement relative thereto about a transverse axis spaced from the axis of said one frame and means for releasably retaining said brace in a plurality of selected positions relative to an associated one of the rails to retain said one frame in said first and second positions and in a range of positions therebetween.

10. An adjustable ski rack as set forth in claim 2 wherein said support members are constructed and arranged to permit said pivotal movement thereof between said first and second positions while the skis are attached thereto by said securing means.

11. In combination, a luggage carrier for attachment to an automobile and having relatively spaced rails, and a ski rack including a plurality of relatively spaced support members across which the skis are supported in generally parallel side-by-side relation, means for detachably securing skis to said support members, and means connecting each of said support members to at least one of said rails for pivotal movement relative thereto, each of said support members having a fixed radial length, said support members being pivotally movable between a first position wherein said support members are disposed in a plane generally parallel to and generally adjacent the plane of said rails and the skis are supported generally adjacent said carrier and a second position wherein said support members extend generally vertically upwardly from said one rail and the skis are supported above the carrier in spaced relation to said rails and generally parallel thereto.

12. An adjustable ski rack for use in combination with a luggage carrier having relatively spaced rails said ski rack comprising, a plurality of relatively spaced support members across which the skis are supported in parallel side-by-side relation, said support members connected to at least one of said rails for pivotal movement about a generally longitudinally extending axis between a first position wherein said support members extend generally transversely of the rails and said skis are supported generally adjacent the luggage carrier and a second position wherein said support members extend generally upwardly from said one rail and said skis are supported in spaced relation to said one rail, and means for detachably securing said skis to said support members.

13. An adjustable ski rack as set forth in claim 12 wherein said means for detachably securing said skis comprises a plurality of clamp members, each of said clamp members being connected to an associated one of said support members for movement relative thereto between a clamping position and a releasing position, said clamp members cooperating in said clamping position to secure the skis generally adjacent said support members and in said releasing position permitting removal of the skis from said rack.

14. An adjustable ski rack as set forth in claim 13 including means for maintaining the skis generally adjacent said support members when said clamp members are in said releasing position and said support members are in said second position.

15. An adjustable ski rack as set forth in claim 14 wherein said maintaining means comprises a relatively spaced series of generally L-shaped ski support brackets projecting from each of said support members and toward an associated one of said clamp members in said clamping position.

16. An adjustable ski rack for use in combination with a luggage carrier having relatively spaced rails said ski rack comprising two relatively spaced sets of opposed support members for supporting said skis in generally parallel side-by-side relationship, each of said support members being connected to an associated one of the rails for pivotal movement relative thereto between a first position wherein said support members in each of said sets cooperate to transversely span the rails for supporting said skis generally adjacent the luggage carrier and a second position wherein said support members in each of said sets extend upwardly from the rails for supporting said skis in spaced relation to the rails, and means for detachably securing said skis to said supporting means.

17. An adjustable ski rack as set forth in claim 16 including means for releasably connecting the free end portions of the support members in each of the said pairs in said first position.

References Cited
UNITED STATES PATENTS

| | | | |
|---|---|---|---|
| 1,687,396 | 10/1928 | Shidler | 224—42.13 X |
| 2,754,041 | 7/1956 | Chaudiere. | |
| 2,833,453 | 5/1958 | Barreca | 224—42.1 X |
| 3,333,750 | 8/1967 | Porter | 224—29 |

FOREIGN PATENTS

| | | |
|---|---|---|
| 105,322 | 8/1942 | Sweden. |
| 1,004,722 | 11/1951 | France. |
| 303,500 | 2/1955 | Switzerland. |

GERALD M. FORLENZA, Primary Examiner

R. J. SPAR, Assistant Examiner

U.S. Cl. X.R.
224—42.01